W. H. LAMMERS.
SNAP FASTENER.
APPLICATION FILED AUG. 1, 1918. RENEWED MAY 28, 1920.

1,348,011.

Patented July 27, 1920.

WITNESSES
Arthur Frisch
Geo. H. Beeler

INVENTOR
Wm. H. Lammers
BY
ATTORNEYS

UNITED STATES PATENT OFFICE.

WILLIAM H. LAMMERS, OF NEW YORK, N. Y.

SNAP-FASTENER.

1,348,011.   Specification of Letters Patent.   Patented July 27, 1920.

Application filed August 1, 1918, Serial No. 247,815. Renewed May 28, 1920. Serial No. 385,069.

*To all whom it may concern:*

Be it known that I, WILLIAM H. LAMMERS, a citizen of the United States, and a resident of the city of New York, borough of Bronx, in the county of Bronx and State of New York, have invented a new and Improved Snap-Fastener, of which the following is a full, clear, and exact description.

My invention relates to separable fasteners such as are commonly used on garments or other devices made of fabric or the like, and has special reference to what are now commonly called snap fasteners, as distinguished from hooks and eyes, buttons, or the like.

Among the objects of the invention is to provide a snap fastener of minimum thickness when applied to a garment.

Another object of the invention is to provide a snap fastener one portion of which includes a head having a more positive connection with the socket member in the practice of the invention than is ordinarily true of snap fasteners.

More specifically stated, I provide a snap fastener comprising coöperating head and socket members adapted to be attached to each other in the usual manner by forcing the head directly into the socket, but which are not easily separable directly, the separation being effected by a lateral or sliding movement.

In the accompanying drawings, forming part of the application, similar characters of reference indicate corresponding parts in all the views.

Figure 1:
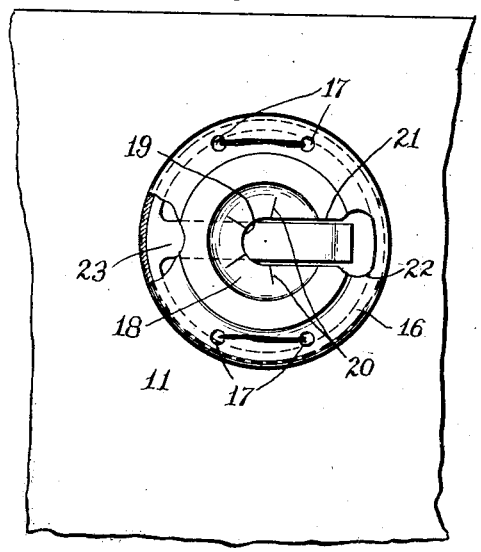
Figure 1 is an outside face view of the socket member secured to a fabric.
Figure 2:
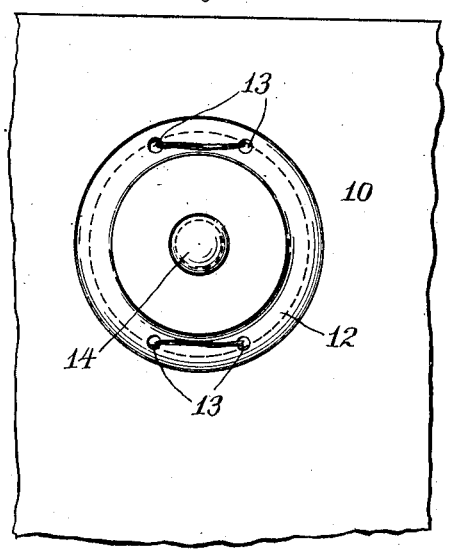
Fig. 2 is a similar view of the head member.

Referring now more specifically to the drawings, I show my improvement as comprising two coöperating parts, viz., the head and socket members 10 and 11 respectively. Each of these members comprises any suitable rim or body structure adapted to be fastened to the garment or fabric. The head member, accordingly, comprises a rim 12 having holes 13 for the passage of the thread or other fastening means. This member is shown as formed or stamped from thin sheet metal and including a head 14 attached to a shank 15. The shoulder 14' on the inner side of the head may be relatively flat or square, as distinguished from the tapering shoulder of the older forms of snap fasteners.

The socket member 11 in the form shown is made preferably of sheet metal and includes a rim 16 having thread holes 17 for the usual purpose. The eye or socket portion proper of this member indicated at 18 is concaved or saucer shape to facilitate the entrance of the head 14 therethrough in fastening the parts together. The eye 19, or opening of this socket, is smaller in diameter than the head 14, and to facilitate the passage of the head therethrough I may provide a series of radial slits 20 which permit the flexing or bending outward of the portions of the socket surrounding the eye, but which from the structure of the concavity will not permit the bending or distortion of the socket in the opposite direction under the strain applied thereto by the shoulder 14'. Since the shoulder is made relatively square or flat it will thus be seen that the two parts cannot be separated by a direct-pull movement as is the usual practice, at least not so readily.

As indicated at 21, I provide a slot leading radially from the eye 19 and terminating within the rim 16 in an enlargement 22 as large in diameter as the head 14. In fastening this socket member to the garment the slot 21 is placed remote from the direction in which the strain would naturally come so that the head member will bear against the unslotted portion of the socket. To unfasten the members, however, a simple sliding movement of the head member along the slot will serve to pass the end 14 through the enlargement 22.

Figure 3:
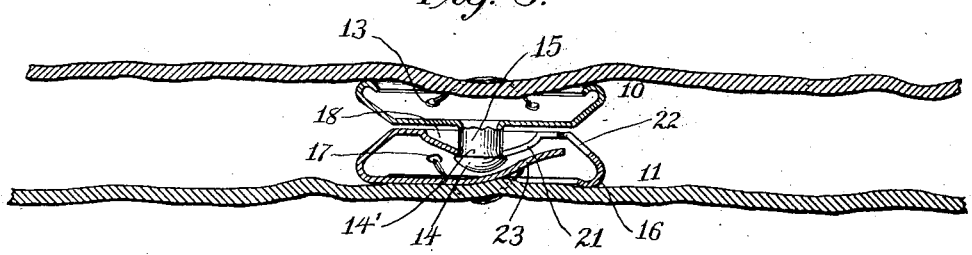
Fig. 3 is a sectional view of both members attached to each other.

23 indicates the tongue, guard, or guide. In other words, this member is formed in the nature of a tongue and either integral with one side of the rim 16 or secured thereto by any other suitable means. As indicated in the broken portion of Fig. 1 and in Fig. 3 the tongue extends from the portion of the rim opposite the opening 22 directly over the socket and thence is bent at its end toward the slot 21. In its office as a guard, therefore, this tongue, as indicated in Fig. 3, will prevent accidental unfastening of the parts. Naturally the tongue is resilient, however, and will not prevent the movement of the head along the slot under such slight force as would be applied in separating the parts. In its office as a guide, it insures that the head will be directed to and through the enlargement 22 at the outer end of the slot so that there can be no delay or difficulty incident to the movement of the head from the socket member.

It will be noted that my improved structure is such that there is only one piece of material employed in each of the two parts and, therefore, I dispense with the troublesome and expensive separate spring, or springs, that are commonly used in such devices.

I claim:

1. In a snap fastener, a head member having a relatively square shoulder, and a socket member having an eye through which the head is directly and bodily projected in a direction parallel to the central axis thereof in attaching the parts, the socket member however preventing the withdrawal of the head in the direction directly opposite to the aforesaid direction of attachment.

2. In a snap fastener, a head member and a socket member, the socket member having a socket with a central eye through which the head is projectable directly but so constructed that the head is held from reverse movement in the directly opposite direction, the socket member having a slot leading laterally from the eye through which the head may be passed by a sliding movement parallel to the plane of the socket member.

3. In a snap fastener, a socket member comprising a continuous annular rim, a socket portion secured centrally thereof and having an eye and a slot leading laterally from the eye shorter than the radius of the rim, said slot terminating at its outer end in an enlargement, and a head member cooperating with the socket member, the head passing bodily through the eye in the center of the socket member in attaching the parts together and thence radially along the slot and through the enlargement in separating the parts.

4. In a snap fastener, the combination of a socket member having a central eye and a slot leading therefrom laterally, a head member including a head adapted to pass directly and bodily through the eye in connecting the parts and movable laterally from the eye along the slot for disconnection, and a member carried by the socket member serving to prevent accidental movement of the head along the slot.

5. In a snap fastener, the combination of a socket member comprising a socket portion with an eye in the center thereof and a slot leading laterally from the eye and also including a continuous rim, a head member having a head projectable directly through the eye of the socket in connecting the parts and movable parallel to the socket member along the slot for disconnection, and a flexible tongue fixed to the socket member remote from the slot and serving to prevent accidental movement of the head along the slot.

WILLIAM H. LAMMERS.